March 1, 1960 L. A. PETERMANN 2,926,622
ULTRASONIC SOLDERING POT
Filed Aug. 23, 1955
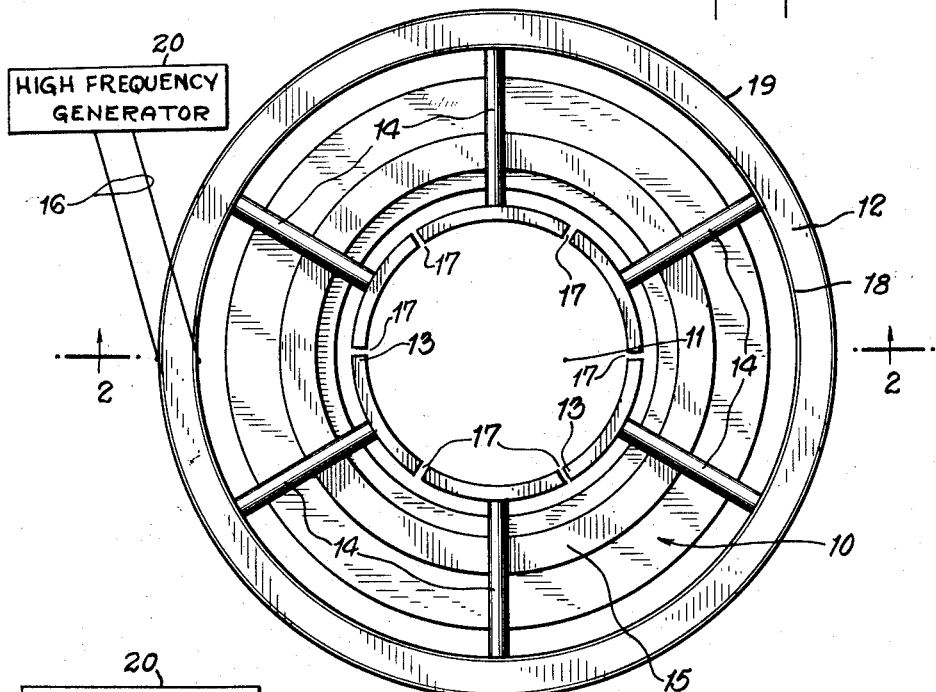
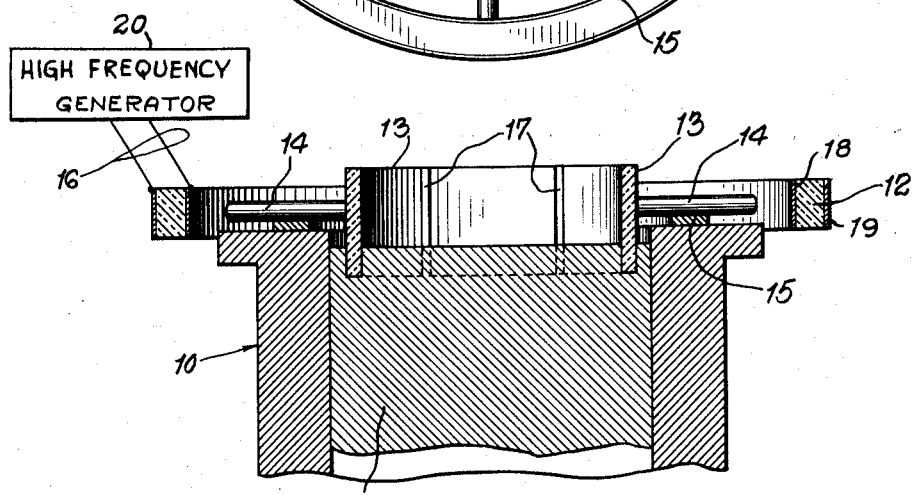
INVENTOR.
LUCIEN A. PETERMANN
BY
ATTORNEY

United States Patent Office 2,926,622
Patented Mar. 1, 1960

2,926,622

ULTRASONIC SOLDERING POT

Lucien A. Petermann, Metuchen, N.J., assignor to Gulton Industries, Inc., a corporation of New Jersey Application August 23, 1955, Serial No. 530,080

5 Claims. (Cl. 113—111)

My invention relates to ultrasonic soldering pots and in particular to those ultrasonic soldering pots in which the ultrasonic waves are transmitted to the molten solder by an insulating cylinder which is mechanically coupled to the driving transducer.

It has been found that, when the surfaces of metals are kept very clean and free from any oxide layer, the metals may be soldered without the use of fluxes or other special techniques. Up to now, this has been difficult to accomplish, particularly in the case of metals such as aluminum and magnesium. Use of ultrasonic vibrations has been made in order to break the oxide layers on these metals and to clean the metal surfaces; while simultaneously applying molten solder to the metal. I have invented a device whereby ultrasonic vibrations of high intensity may be utilized during the soldering procedure.

Previously, it has been difficult to transfer sufficient ultrasonic energy from the transducer to the solder because the heat of the molten solder affected the operation of the transducer. Various means have been tried but the mechanical energy transferred to the molten solder has been too small to produce good action on the piece to be soldered.

Accordingly, it is a principal object of my invention to provide an ultrasonic soldering pot wherein the transducer is not in contact with the heated solder.

It is a further object of my invention to provide an ultrasonic soldering pot which may be utilized for dip soldering.

It is a still further object of my invention to provide an ultrasonic soldering pot wherein there is a large transfer of mechanical energy from the transducer to the solder.

Other objects and advantages of my invention will be apparent during the course of the following description.

In the accompanying drawings forming a part of this application, and in which like numerals are employed to designate like parts throughout the same, Figure 1 is a plan view of a preferred embodiment of my invention, and Figure 2 is a cross-sectional view of the embodiment of Figure 1 along the line 2—2.

In the drawings, wherein for the purpose of illustration, is shown a preferred embodiment of my invention, the numeral 10 designates the solder pot, generally, in which is contained solder 11. Transducer 12 is mounted external to 10 and drives split ring 13 by means of connecting rods 14. Insulating support 15 is mounted on 10 and supports rods 14. Electrical excitation leads 16 are utilized to supply excitation voltage from the high frequency, alternating current generator, shown diagrammatically and designated 20, to transducer 12 by means of electrodes 18 and 19 which are suitably applied to 12, and openings 17 serve to split 13 at suitable points.

Ultrasonic excitation of molten solder has been employed in order to keep the surface to be soldered clean and free of oxides so that metals such as aluminum, magnesium and like materials as well as many alloys may be soldered. When the metal to be soldered is not clean and free from oxide layers, it is not possible to obtain a bond on the foregoing materials. In addition, the advent of the so-called "dip soldering" technique has increased the need for a means of cleaning and removing oxide from metals. In "dip soldering" the parts or assemblies to be soldered are dipped in the solder pot such that the molten solder covers the areas to be soldered to a predetermined level and the parts or assemblies are then removed from the solder pot so that the solder cools and hardens. The parts or assemblies may be carried to and through the pot by any of a number of production techniques such as moving belts, perforated trays, moving clipping or clamping holders or any other similar method. Of course, the slower techniques, which involve hand operated dipping procedures, may also be employed. The solder is kept molten by the application of heat to the pot by any of the usual means such as gas, oil, electricity or any other method.

In the preferred embodiment of my invention, illustrated in the figures, solder 11 is placed in solder pot 10 and heat is applied to solder pot 10 so that 11 is kept in its molten state. The heat may be applied in any convenient manner by any desirable method. High frequency, alternating current generator 20 supplies excitation voltage to transducer 12 through electrical excitation leads 16. Transducer 12 is preferably made in the shape of a hollow cylinder but it may be constructed with other hollow shapes with a horizontal section other than a circle such as an ellipse, square, rectangle, polygon, and like figures. Transducer 12 may be constructed of natural piezoelectric material, polarized electrostrictive ceramic (composed principally of barium titanate or similar material) or magnetostrictive material. The output frequency of generator 20 is substantially equal to the radial mode resonant frequency of transducer 12. Therefore, transducer 12 will vibrate in its radial mode and will cause connecting rods 14 to move in and out toward split ring 13, thereby causing 13 to vibrate radially in accordance with the mechanical vibrations of 12. The radial resonant frequency of transducer 12 is determined by its dimensions and if the driving voltage applied to it by generator 20 is at this radial resonant frequency, a large radial motion of transducer 12 takes place. This motion is transmitted through rods 14 to split ring 13, as described above, and the radial movement of split ring 13 in solder 11 causes high intensity ultrasonic agitation near the center of the surface of solder 11 which is contained in pot 10. 13 is preferably formed of fused quartz but any other similar material may be employed. Ring 13 is split because I have found that a continuous ring has a tendency to shatter as the excitation is increased. Use of a split ring also compensates for the difference in thermal expansion of the various elements. The openings 17 which split the ring 13 are placed so that the various portions of 13 are driven symmetrically by 12 and 14. As few as two openings 17 may be utilized to split the ring 13.

The connecting rods 14 are placed on insulating support 15 which is mounted on 10 and serves to support the whole assembly 12—14—13. The material of 15 is such that it does not impede the motion of the assembly 12—14—13 and maximum ultrasonic energy is transmitted to 13. Certain of the plastic materials have been found to be satisfactory.

Ring 13 is inserted in 10 so that the level of solder 11 is above the lower edge of 13. The ultrasonic motion of 13 is transmitted through 11 and the dipped metal is cleaned by the cavitation produced by the high ultrasonic intensity. It is best that 10 be kept as full as possible so that as much of solder 11 as is possible is subjected to the treatment of the ultrasonic motion of 13. On the other hand, 11 has a damping action of 13, so that there is an optimum solder level for successful soldering.

A further advantage accruing from the use of a cylindrical transducer and split ring operated in essentially radial motion resides in the fact that the ultrasonic waves produced cause the solder to converge toward the center of the circles, at which point the ultrasonic waves are of large intensity. It is thereby possible to drive the transducer with moderate power and take full advantage of the existence of high ultrasonic intensity near the center of the pot. Consequently, a small assembly may be "dip-soldered" in a very short time.

While I have described my invention by means of specific examples and in a specific embodiment, I do not wish to be limited thereto, for obvious modifications will occur to those skilled in the art without departing from the spirit of my invention or the scope of the subjoined claims.

Having thus described my invention, I claim:

1. An ultrasonic soldering pot comprising a heat resistant container, solder contained in said container, high frequency, alternating current generating means, a hollow transducer, an insulating ring mounted on the top of said container, a plurality of bodies of insulating material, said bodies being portions of and together forming a split, hollow body smaller in radius than said transducer, radial connecting means mechanically connecting said transducer to said plurality of bodies, said radial connecting means being supported on said insulating ring and projecting inwardly therefrom, said plurality of bodies being mounted so that their lower portions are below the level of said solder contained in said container, said transducer being excited in radial mode by said generating means.

2. An ultrasonic soldering pot as described in claim 1 wherein said transducer is piezoelectric and of such dimensions and shape that said transducer vibrates in radial mode.

3. An ultrasonic soldering pot as described in claim 2 wherein said transducer is a polarized ceramic.

4. An ultrasonic soldering pot as described in claim 3 wherein said transducer is composed largely of titanates.

5. An ultrasonic solder pot as described in claim 1 wherein said transducer and said smaller, inner, split hollow body are cylinders.

References Cited in the file of this patent

UNITED STATES PATENTS

| | | |
|---|---|---|
| 1,318,740 | Fessenden | Oct. 14, 1919 |
| 2,397,400 | Barwich | Mar. 26, 1946 |
| 2,578,505 | Carlin | Dec. 11, 1951 |
| 2,775,749 | Sussman | Dec. 25, 1956 |
| 2,815,193 | Brown | Dec. 3, 1957 |
| 2,824,543 | Brown | Feb. 25, 1958 |

OTHER REFERENCES

Soldering Aluminum With Sound Waves, Modern Metals, July 1948, page 36.